United States Patent
Manabe

[19]

[11] Patent Number: 6,044,078
[45] Date of Patent: *Mar. 28, 2000

[54] METHOD OF AND SYSTEM FOR EXCHANGING INFORMATION OF PAYLOAD FIELDS OF ATM CELLS

[75] Inventor: Hisashi Manabe, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/825,915

[22] Filed: Apr. 2, 1997

[30] Foreign Application Priority Data

Apr. 11, 1996 [JP] Japan .................................. 8-089654

[51] Int. Cl.[7] .............................. H04J 3/16; H04L 12/56
[52] U.S. Cl. ......................... 370/395; 370/476; 370/472
[58] Field of Search .................... 370/395, 466, 370/470, 471, 472, 474, 476

[56] References Cited

U.S. PATENT DOCUMENTS

| | | | |
|---|---|---|---|
| 4,999,835 | 3/1991 | Lagoutte | 370/395 |
| 5,390,175 | 2/1995 | Hiller et al. | 370/398 |
| 5,410,540 | 4/1995 | Aiki et al. | 370/395 |
| 5,414,696 | 5/1995 | Tsuzuki et al. | 370/395 |
| 5,422,882 | 6/1995 | Hiller et al. | 370/352 |
| 5,426,636 | 6/1995 | Hiller et al. | 370/352 |
| 5,428,607 | 6/1995 | Hiller et al. | 370/352 |
| 5,452,297 | 9/1995 | Hiller et al. | 370/395 |
| 5,557,621 | 9/1996 | Nakano et al. | 371/37.1 |
| 5,703,879 | 12/1997 | Proctor et al. | 370/398 |
| 5,790,804 | 8/1998 | Osborne | 709/245 |
| 5,822,321 | 10/1998 | Petersen et al. | 370/474 |
| 5,844,887 | 12/1998 | Oren et al. | 370/218 |

FOREIGN PATENT DOCUMENTS

| | | |
|---|---|---|
| 4-98937 | 3/1992 | Japan . |
| 5-122241 | 5/1993 | Japan . |
| 7-245628 | 9/1995 | Japan . |
| 7-336354 | 12/1995 | Japan . |
| WO 95/17789 | 6/1995 | WIPO . |

OTHER PUBLICATIONS

International Telecommunication Union Article—"Integrated Services Digital Network (ISDN)—Overall Network Aspects and Functions" (ITU–T Recommendarion/Previously CCITT Recommendation), I.361/pp. 1–12).

*Primary Examiner*—Hassan Kizou
*Assistant Examiner*—John Pezzlo
*Attorney, Agent, or Firm*—Foley & Lardner

[57] ABSTRACT

A method of and a system for exchanging information of payload field of ATM cells wherein the minimum exchanging unit is 1 byte removing the limitation of the current ATM exchanging unit to 48 bytes (1 cell). The payload fields of ATM cells are divided into units of 8×N bits to effect exchanging operation, and the exchanging operation is performed by a function of copying ATM cells and rearrangement in position of information of payload field. The rearrangement in position of information of payload field is performed by a position switch which performs rearrangement within an ATM cell and between ATM cells. The position switch selects divided part informations in the payload fields with a signaling signal. The division of the payload field into units of 8×N bits may be a division other than a division beginning with the first bit of an ATM cell immediately following a header.

12 Claims, 5 Drawing Sheets

METHOD OF AND SYSTEM FOR EXCHANGING INFORMATION OF PAYLOAD FIELDS OF ATM CELLS

BACKGROUND OF THE INVENTION

1. Field of the Invention

This invention relates to an ATM exchange, and more particularly to a method of and a system for exchanging a low speed ATM channel of 3 Mb/s or less.

2. Description of the Related Art

The minimum basic unit in exchanging by an ATM exchange is an ATM cell formed of 53 bytes. The ATM cell has an information field called payload including 48 bytes, and such 48 bytes are handled as 1 block in exchanging. Accordingly, in a synchronous transmission line in which 1 frame requires 125 μS, exchanging by an ATM exchange yields an information absent field in an ATM cell, resulting in drop of the transmission efficiency. Consequently, exchanging by an ATM exchange is not suitable for ATM communication of approximately 3 Mb/s (48 bytes/125 μS) or less.

Low speed synchronous information such as voice is not suitable for exchanging by an ATM exchange because the minimum unit of composition of an ATM is one cell and information of the payload field is not divided.

SUMMARY OF THE INVENTION

It is an object of the present invention to provide a method of and a system for exchanging information of payload field of ATM cells wherein the current limitation of the minimum exchanging unit of an ATM to 48 bytes (1 cell) is eliminated to allow the minimum exchanging unit to be 1 byte.

In a method of and a system for exchanging information of payload field of ATM cells according to the present invention, payload fields of ATM cells are divided into units of 8×N bits, and an exchanging operation is performed for the divided part informations. The exchanging operation is performed by a function of copying the ATM cells and rearrangement of positions of the informations of the payload fields, and the rearrangement of positions of the informations of the payload field is performed by a position switch which performs exchanging within an ATM cell and between ATM cells. The position switch selects the divided part informations in the payload fields with a signaling signal.

The division of the payload field into units of 8×N bits may be a division other than a division beginning with the first bit of an ATM cell immediately following a header.

BRIEF DESCRIPTION OF THE DRAWINGS

FIGS. 5(a) and 5(b) are block diagrams illustrating position rearrangement of information of payload field in the embodiment of the present invention, and wherein FIG. 5(a) is a view illustrating a manner in which only divided part informations having a same header in one frame are aggregated and FIG. 5(b) is a view in which the information aggregated in a work memory is re-written as information of payload field into a buffer memory of the position switch.

DESCRIPTION OF THE PREFERRED EMBODIMENT

Generally, in a multiplex channel for synchronous real-time information (example: multiplex voice channel), individual channels are identified based on the positional relationship on a frame (time base) sent out. Since this positional relationship can be maintained also after conversion into cells, individual informations prior to multiplexing can be identified based on the positional relationship in an information field (payload) of an ATM cell. The present invention makes use of this fact to solve the subject by dividing payload fields into units of 8×N bits and changing the positional relationship in the division (intra-cell exchange) and by rearranging the information (8×N bits) in the division to particular divisions of the payloads of cells which are directed to different orientations (inter-cell exchange).

According to the present invention, digital informations of a low speed synchronous system are multiplexed identifying the positional relationship of them and then converted into cells and transmitted, and at an object termination point, they are demultiplexed in accordance with the positional relationship to regenerate the original low speed informations. In the conventional system, a group of informations after converted into cells are directed to a same location while maintaining the form of the group, and exchanging within the group is not involved. The present invention allows exchanging of digital informations after converted into cells, that is, exchanging of digital informations of a low speed synchronous system because it allows exchanging of informations in the payload field.

An embodiment of the present invention is described below with reference to the drawings.

Figure 1:
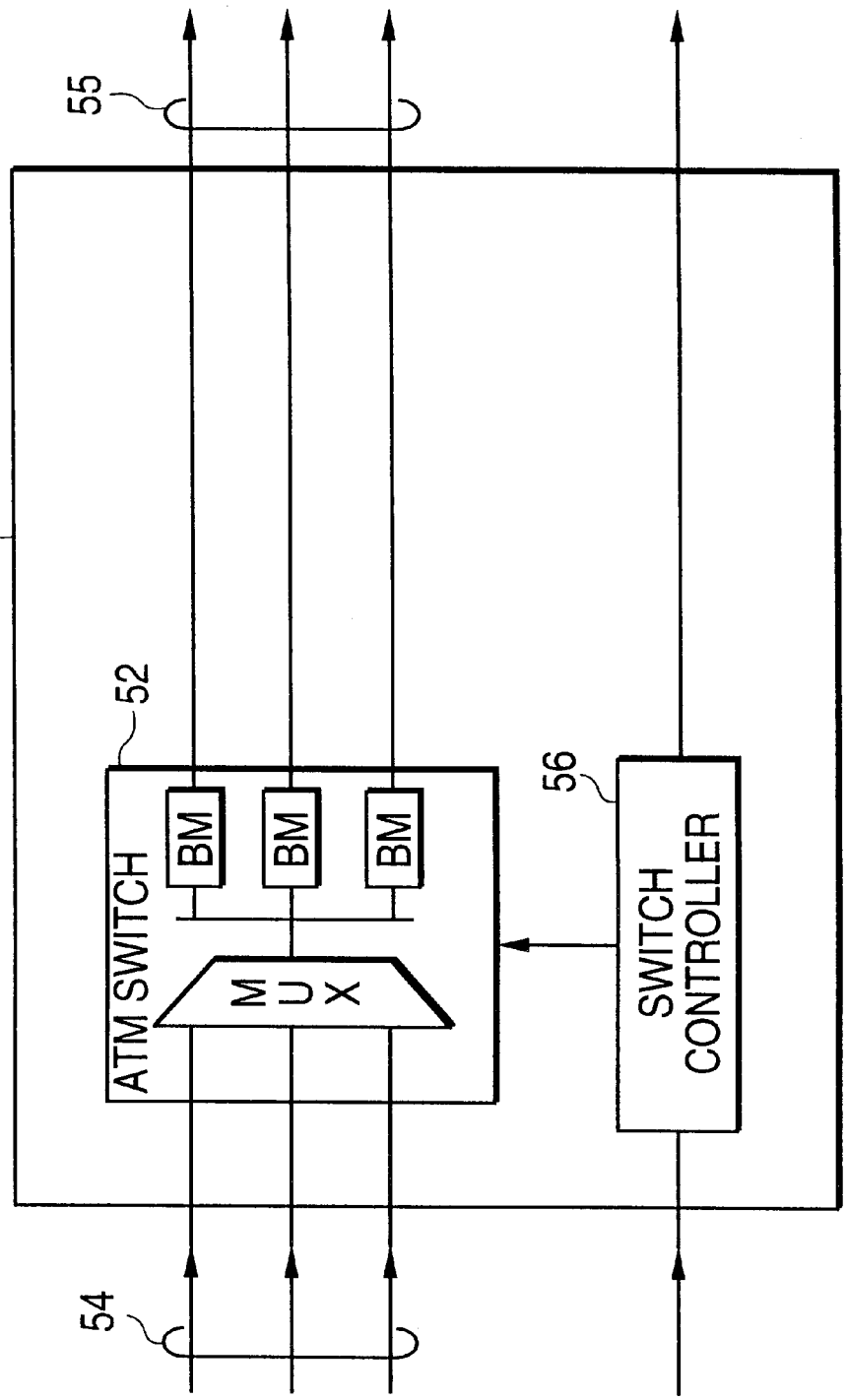
FIG. 1 is a block diagram showing a system construction of an ATM exchange according to the prior art.
Figure 2:
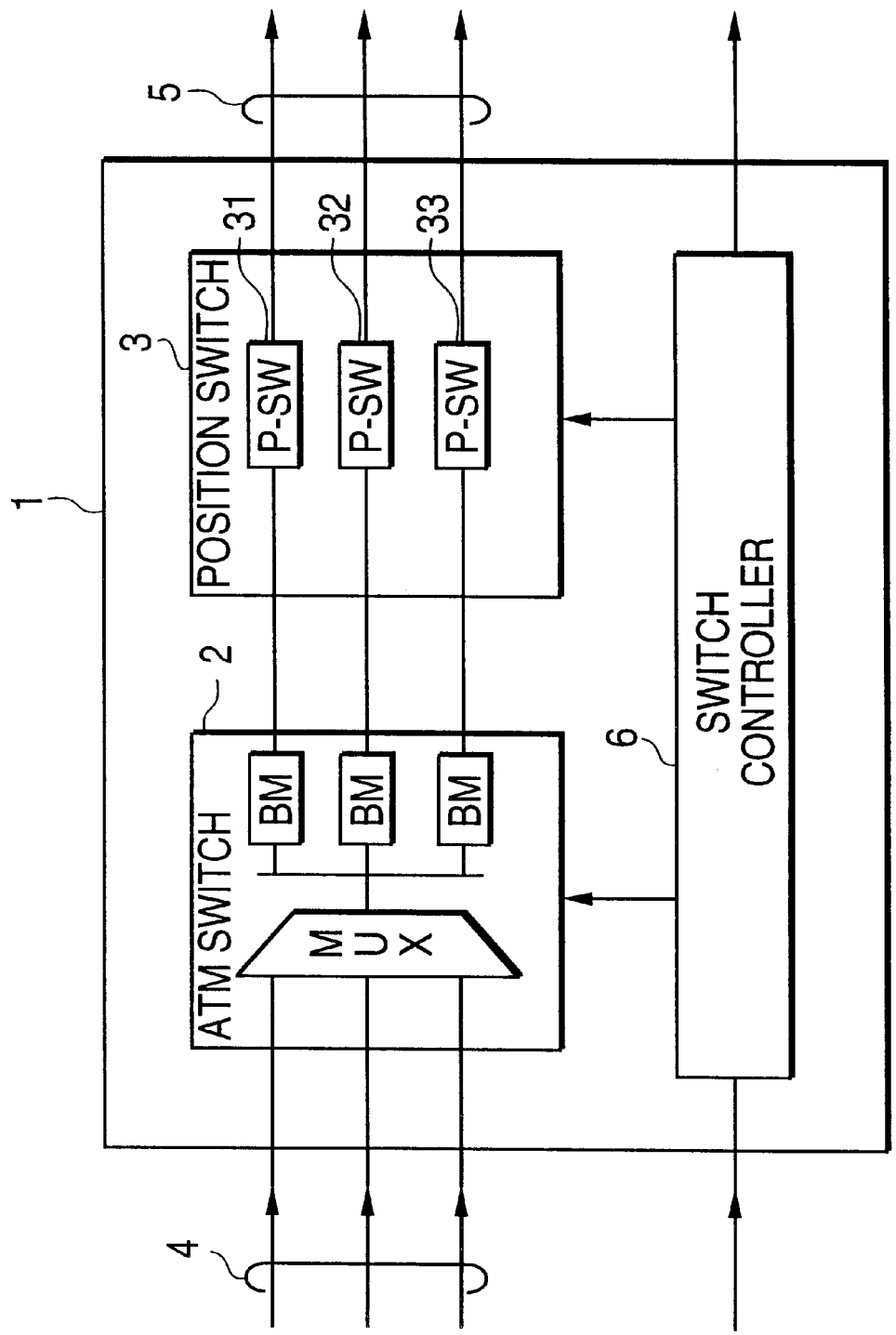
FIG. 2 is a block diagram showing a system construction of an ATM exchange of an embodiment of the present invention.

FIG. 2 is a block diagram showing a system construction of an ATM exchange of an embodiment of the present invention. Referring to FIG. 2, reference numeral 1 denotes an ATM exchange which includes an exchanging system for information of payload field of ATM cells, 2 an ATM switch, for example, of the output buffer type, 3 a position switch for dividing payload fields into units of 8×N bits and rearranging the units, 4 an ATM cell input port, 5 an ATM cell output port, and 6 a switch controller for controlling the ATM switch and the position switch by signaling.

Figure 3:
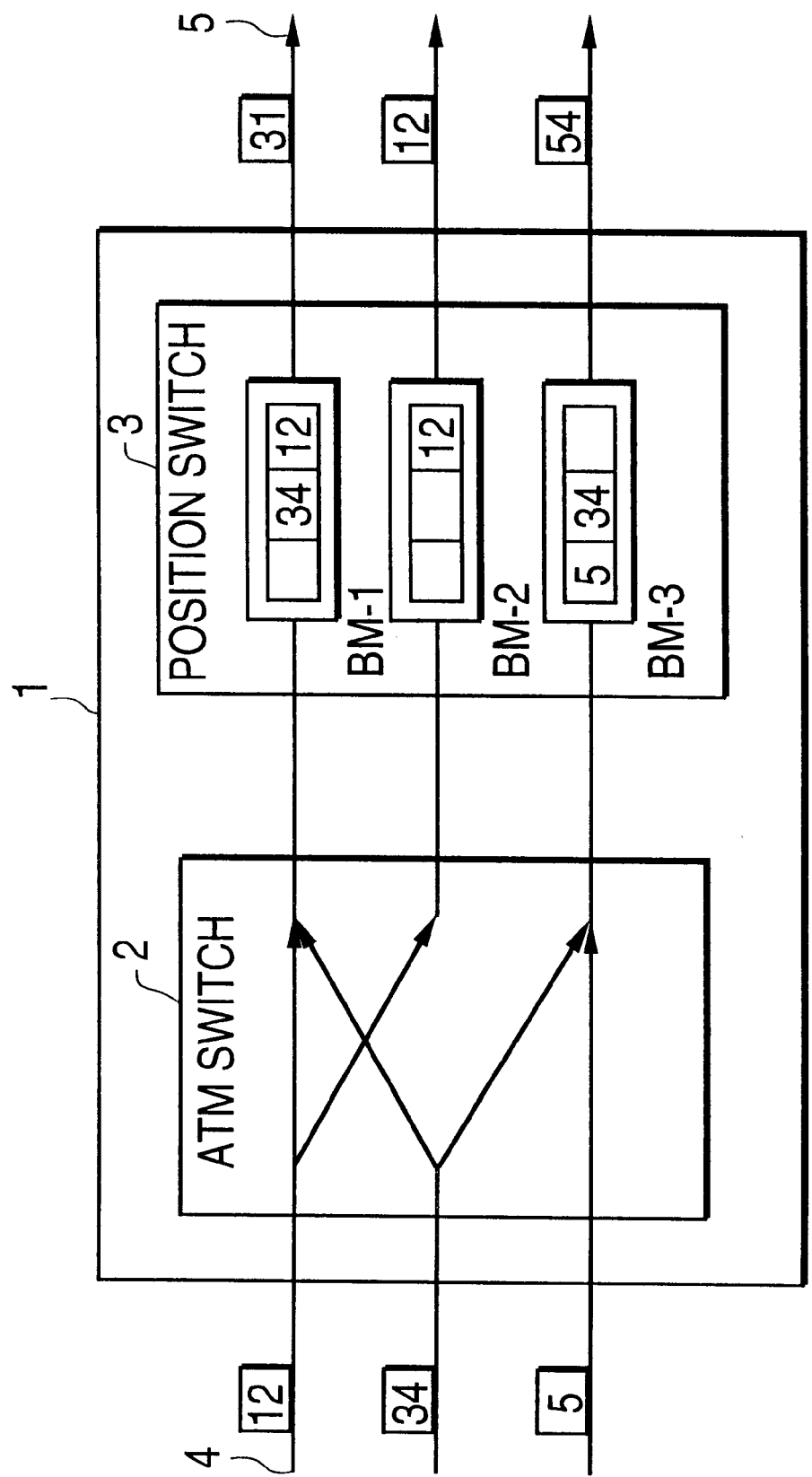
FIG. 3 is a block diagram illustrating an exchanging process of ATM cells in the embodiment of the present invention.

FIG. 3 is a block diagram illustrating a switching process for ATM cells in the embodiment of the present invention. ATM exchange 1 has a two-stage construction, and ATM switch 2 serves as the first stage and has a function of transferring input cells to the plurality of output ports by an ATM copying function. The entire input cells are transferred to all of the output ports corresponding to destinations of multiple channels present in the input cells by switch controller 6. Position switches 3 are provided, as the second stage, corresponding to the output ports and each applies masking (position information) to divided informations for the other channels of a plurality of cells received from the plurality of input ports to extract voice informations (8×N bits) for the self channel, re-sets the voice informations to the information fields of new cells (inter-cell exchanging action) and sends out the new cells from the corresponding output port to a next location. In this instance, when necessary, rearrangement of information positions in a same cell (intra-cell exchanging) is performed.

Figure 4:
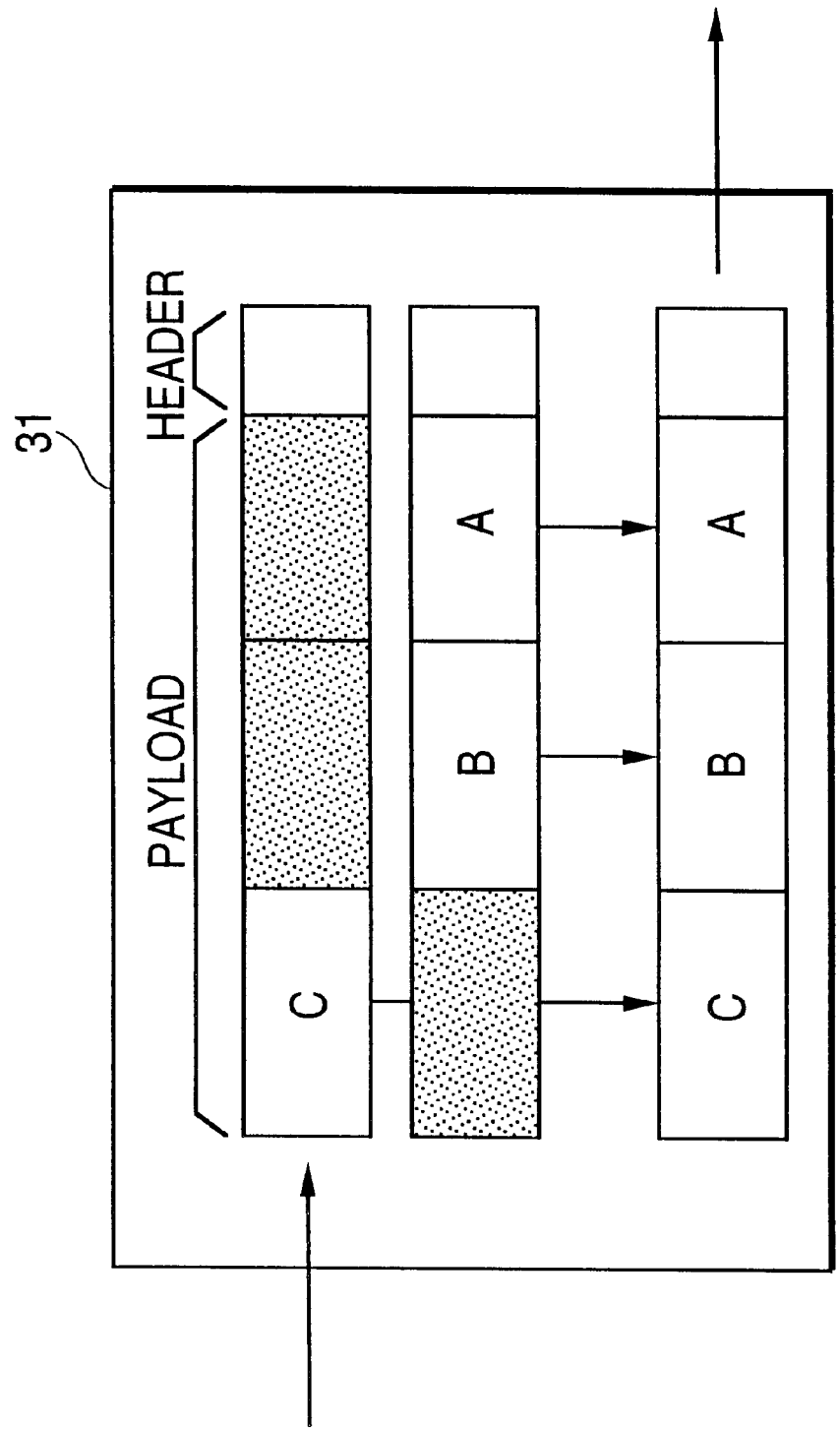
FIG. 4 is a diagrammatic view illustrating a concept of a position switch in the embodiment of the present invention.

FIG. 4 is a diagrammatic view illustrating a system concept of a position switch. The position switch applies masking (position information) to divided part informations for the other channels from the information fields of a plurality of ATM cells received from the plurality of input ports by a copying function of the ATM to extract only the divided part informations (voice information) for the self channel and produces the information fields for new cells.

Figure 5A:
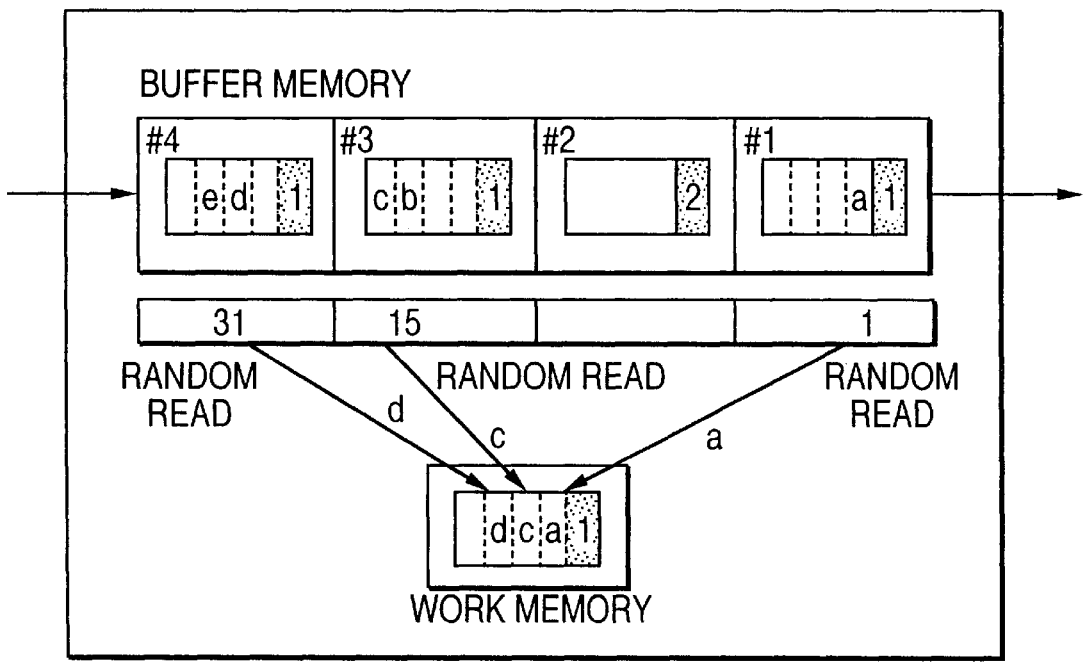
Figure 5B:
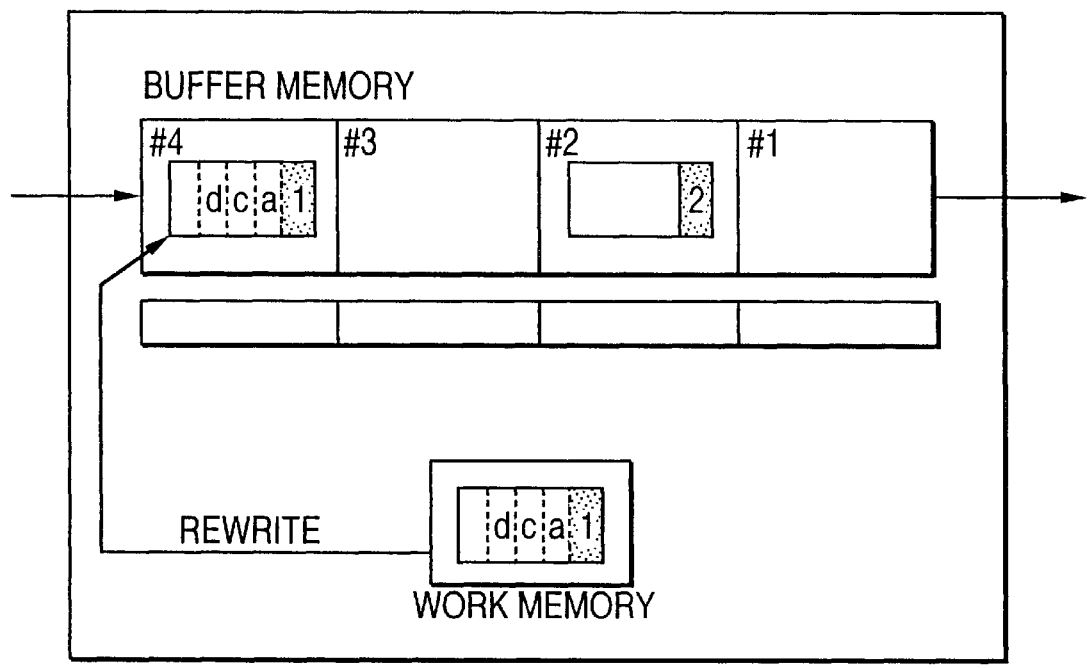

FIGS. 5(a) and 5(b) are block diagrams of an example of a concrete construction illustrating position rearrangement of informations of payload field. FIG. 5(a) is a view illustrating a manner in which only divided part informations having a same header in one frame are aggregated in a work memory. As seen from FIG. 5(a), divided part informations copied in the buffer memory of the position switch by a copying function of the ATM are read out at random with information obtained by signaling corresponding to the output port, written into the working memory and aggregated. In particular, as seen from FIG. 5(a), only those ones a, c and d of divided part informations a to e of ATM cells #1 to #4 as part of successively inputted ATM cells which correspond to the number 1 of the information obtained by signaling are extracted into the working memory while the divided part informations of the number 3 and the number 5 corresponding to the other output ports are processed by the buffers for the other output ports. Further, since the ATM cell #2 in FIG. 5(a) does not include low speed divided part informations, it is sent out as it is.

FIG. 5(b) is a view illustrating a manner in which the divided part informations aggregated in the working memory are re-written as information of payload field into the buffer memory of the position switch.

Next, as a concrete embodiment, it is assumed that the ATM exchange of the present invention receives, at the input thereof, ATM cells obtained by conversion of digitized (for example, at 64 kb/s) and multiplexed (for example, for 30 channels) voice line information for each one frame (125 $\mu$S). In this instance, it is assumed that the order of accommodation of the audio informations (8 bits) of the information fields of the ATM cells is the same as the order of the positions of the multiplex channels. Further, it is assumed that, as destinations of the individual divide part informations, the divided part informations are inputted to the present ATM exchange by signaling.

The first stage in the present ATM exchange is formed from the ATM switch having a copying function. A plurality of channels of the divided part informations present in the inputted ATM cells are known, and the input ATM cells are sent at a time to the plurality of output ports as seen in FIG. 3.

The second stage is formed from a position switch provided for each of the output ports. The position switch has a buffer memory for a plurality of ATM cells corresponding to the number of input ports and has a function of masking the payload field in units of 8 bits. The masking is controlled with information obtained by signaling and can extract voice informations (8 bits) to be sent out from the output port as seen in FIG. 5(a). The output port sets the extracted informations to the information fields of new cells as seen in FIG. 5(b), adds header information to the new cells and sends out the resulting cells.

The division of the payload field into units of 8×N bits may be other than that beginning with the first bit immediately following a header. In particular, the first bit is ignored, and the following payload beginning with the second bit is divided into units of 8×N bits. Or, the division may be started from the third, fourth, fifth, sixth or seventh bit (the division beginning with the eighth bit is the same as that beginning with the 0th bit).

According to the present invention, since exchanging connection in units of 1 byte (8 bits) in a payload of an ATM cell is allowed, there is an effect that exchanging of a low speed channel of 64 kb/s for voice or the like can be performed while maintaining the ATM cell as it is.

What is claimed is:

1. A method of exchanging information of payload field of ATM cells, comprising:

receiving, at each of a plurality of input ports of an ATM switch, ATM cells to be transferred out to a particular destination;

copying, by the ATM switch, all received ATM cells that are capable of being outputted to more than one output port of the ATM switch based on a current switch connectivity between the respective input ports and the respective output ports of the ATM switch;

dividing, by a position switch coupled to the ATM switch, payload fields of ATM cells received from the ATM switch into units of 8×N bits; and combining, by the position switch which includes a plurality of buffer memories which are respectively coupled on an input side to the plurality of output ports of the ATM switch and which are respectively coupled on an output side to a plurality of outputs ports of the position switch, the divided payload fields of a plurality of ATM cells to form a payload field for an ATM cell for transmission, wherein the ATM cell for transmission comprises a single header portion that is contiguous and separate from the combined payload fields that collectively make up a data portion of the ATM cell for transmission, and wherein, when there is determined to be at least one of the divided payload fields of an ATM cell transferred from the ATM switch to one of the buffer memories of the position switch that is not destined to be output through the corresponding one of the output ports coupled to the one of the buffer memories, the at least one of the divided payload fields is masked and not output through the one of the output ports.

2. A method of exchanging information of payload field of ATM cells as claimed in claim 1, wherein N of the 8×N bits is an integer which satisfies $1 \leq N \leq 47$.

3. A method of exchanging information of payload field of ATM cells as claimed in claim 1, wherein the combining step includes copying the ATM cells and rearranging positions of the divided payload fields of the ATM cells to create the data portion of the ATM cell for transmission.

4. A method of exchanging information of payload field of ATM cells as claimed in claim 3, wherein the rearranging of positions of the divided payload fields is performed by a position switch which performs exchanging within one of the ATM cells and between at least two of the ATM cells.

5. A method of exchanging information of payload field of ATM cells as claimed in claim 4, wherein said position switch selects the divided payload fields in a particular sequential order with a signaling signal.

6. A method of exchanging information of payload field of ATM cells as claimed in claim 1, wherein the division of the payload field into units of 8×N bits is a division other than a division beginning with the first bit of an ATM cell immediately following a header.

7. A system for exchanging information of payload field of ATM cells, comprising:

an ATM switch that includes,
  a plurality of input ports that receive ATM cells to be transferred output to a particular destination; and
  a plurality of output ports each of which are connected to at least one of the plurality input ports based on a current switching connectivity between the respective input ports and the respective output ports of the ATM switch;
  a copying unit that copies all received ATM cells that are capable of being outputted to more than one output port of the ATM switch based on the current switching connectivity of the ATM switch; and
a position switch that includes,
  a plurality of buffer memories respectively coupled to the plurality of output ports of the ATM switch and each capable of storing more than one ATM cell at a time;
  a payload field dividing unit for dividing payload fields of a plurality of ATM cells received from the ATM switch and currently stored in the plurality of buffer memories, to obtain divided payload fields for each of the ATM cells, wherein the divided payload fields of the ATM cells are divided into units of 8×N bits, N being an integer which satisfies 1<N<47;
  an exchanging unit for performing an exchanging operation of the respective divided payload fields of the ATM cells in units of 8×N bits by copying the ATM cells and rearranging in position the respective payload fields of the ATM cells to create a single payload field for an ATM cell for transmission, the single ATM cell for transmission including a single header portion that is provided separate from the single payload field;
  a plurality of work memories respectively coupled to the plurality of buffer memories and configured to store respective divided payload fields of ATM cells currently stored in the corresponding buffer memory in order to create the single ATM cell for transmission, each of the work memories capable of storing only one ATM cell at a time;
  wherein, when there is determined to be at least one of the divided payload fields of an ATM cell transferred from the ATM switch to one of the buffer memories that is not destined to be output through the corresponding one of the output ports coupled to the one of the buffer memories, the at least one of the divided payload fields is masked and not output through the one of the output ports.

8. A system for exchanging information of payload fields of ATM cells as claimed in claim 7, wherein the rearranging of payload fields is performed by a position switch which selects the divided payload fields within one of the ATM cells and between at least two of the ATM cells with a signaling signal.

9. A method of exchanging information of payload field of ATM cells as claimed in claim 1, wherein the at least one of the divided payload fields that is masked is output via another one of the output ports of the position switch that also received a copy of an ATM cell from the ATM switch that includes the at least one of the divided payload fields therein.

10. A method of exchanging information of payload field of ATM cells as claimed in claim 1, wherein the ATM switch and the position switch are each capable of receiving and outputting standard ATM cells that have payload fields that are not divided, and wherein data within the standard ATM cells are not exchanged or modified in any way as the standard ATM cells make their way through the ATM switch and the position switch to an evental destination.

11. A system for exchanging information of payload field of ATM cells as claimed in claim 7, wherein the at least one of the divided payload fields that is masked is output via another one of the output ports of the position switch that also received a copy of an ATM cell from the ATM switch that includes the at least one of the divided payload fields therein.

12. A system for exchanging information of payload field of ATM cells as claimed in claim 7, wherein the ATM switch and the position switch are each capable of receiving and outputting standard ATM cells that have payload fields that are not divided, and wherein data within the standard ATM cells are not exchanged or modified in any way as the standard ATM cells make their way through the ATM switch and the position switch to an eventual destination.

* * * * *